(12) United States Patent
Nikitin et al.

(10) Patent No.: US 12,277,504 B1
(45) Date of Patent: Apr. 15, 2025

(54) RESOURCE-LEVEL CLASSIFICATION USING LANGUAGE MODELS

(71) Applicant: Cyera, Ltd., Tel Aviv (IL)

(72) Inventors: Andrey Nikitin, Kiryat Ono (IL); Guye Vered, Rishon Letzion (IL); Netta Simhi, Tel Aviv (IL); Inbar Polad, Ramat Gan (IL); Hadas Daniel, Tel Aviv (IL); Yuval Goldberg, Ramat Gan (IL); Dvir Horovitz, Givaatayim (IL); Michal Shaked, Nofit (IL); Itay Rutman, Tel Aviv (IL); Shiran Bareli, Tel Aviv (IL); Yotam Segev, New York, NY (US); Itamar Bar-Ilan, New York, NY (US); Yonatan Itai, Tel Aviv (IL)

(73) Assignee: Cyera, Ltd., Tel Aviv (IL)

( * ) Notice: Subject to any disclaimer, the term of this patent is extended or adjusted under 35 U.S.C. 154(b) by 0 days.

(21) Appl. No.: 18/956,386

(22) Filed: Nov. 22, 2024

(51) Int. Cl.
  *G06N 3/02* (2006.01)
  *G06N 3/091* (2023.01)

(52) U.S. Cl.
  CPC ................................. *G06N 3/091* (2023.01)

(58) Field of Classification Search
  CPC ........................................................ G06N 3/091
  See application file for complete search history.

(56) References Cited

U.S. PATENT DOCUMENTS

| | | | |
|---|---|---|---|
| 10,593,325 B2 | 3/2020 | Hazarika et al. | |
| 10,978,056 B1 | 4/2021 | Challa et al. | |
| 11,302,310 B1 | 4/2022 | Gandhe et al. | |
| 11,861,315 B2 | 1/2024 | Sethi et al. | |
| 11,977,847 B2 | 5/2024 | Szanto et al. | |

(Continued)

FOREIGN PATENT DOCUMENTS

| | | |
|---|---|---|
| CN | 117313695 A | 12/2023 |
| CN | 117453921 A | 1/2024 |

(Continued)

OTHER PUBLICATIONS

Berba, Pepe, "Understanding HDBSCAN and Density-Based Clustering" (Jan. 17, 2024) (available at https://pberba.github.io/stats/2020/01/17/hdbscan/) (last accessed Nov. 21, 2024, at 1:25 PM Eastern time).

*Primary Examiner* — Xin Jia
(74) *Attorney, Agent, or Firm* — M&B IP Analysts, LLC

(57) ABSTRACT

Techniques for training and using machine learning models for resource-level classification. A method for training includes refining outputs of a language model by providing a prompt and a set of sample resources to the language model over a series of iterations. Accuracies for the classifications output by the language model at each iteration are determined based on semantic similarity between those classifications and corresponding reference classifications for the sample resources. The language model is applied to data of a set of training resources when the outputs of the language model have been refined, in order to output a set of classifications for the set of training resources. Training data is labeled based on the set of classifications output by the language model. A classifier machine learning model is trained via supervised machine learning using the set of labeled training data in order to produce a trained classifier machine learning model.

8 Claims, 10 Drawing Sheets

(56) References Cited

U.S. PATENT DOCUMENTS

| | | | |
|---|---|---|---|
| 2021/0232762 A1* | 7/2021 | Munro | G06Q 50/01 |
| 2022/0383190 A1* | 12/2022 | He | G06N 3/045 |
| 2023/0098783 A1* | 3/2023 | Zaremoodi | G10L 15/183 |
| | | | 704/243 |

FOREIGN PATENT DOCUMENTS

| | | | |
|---|---|---|---|
| CN | 118227967 A | | 6/2024 |
| CN | 118364916 A | * | 7/2024 |

\* cited by examiner

RESOURCE-LEVEL CLASSIFICATION USING LANGUAGE MODELS

TECHNICAL FIELD

The present disclosure relates generally to classifying resources in computing environments, and more specifically to classifying resources using language models such as large language models (LLMs).

BACKGROUND

In data security, understanding data can be useful for appropriately protecting that data. In particular, knowledge about what a given set of data represents can be leveraged in order to secure the data at rest or otherwise secure the data within a computing environment. More specifically, certain kinds of data may be more sensitive such that additional security measures should be taken with respect to those kinds of data, or otherwise different kinds of data may require different levels of security.

While certain kinds of data may be secured appropriately once the kind of data is identified, identifying which kinds of data are included in a given data set is a technical challenge. In particular, identifying kinds of data at certain levels of granularity is challenging. This challenge is further compounded when handling portions of data which are not represented uniformly (e.g., in uniform formats or using the same kinds of parameters). That is, data from different sources may be formatted differently or may even include different information (e.g., parameters representing different types of information).

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for machine learning classifier training. The method comprises: refining outputs of a language model by providing a prompt and a set of first resources to the language model over a plurality of iterations, wherein outputs of the language model generated by the language model at each iteration of the plurality of iterations include a plurality of classifications for the set of first resources input to the language model at the iteration, wherein each iteration of the plurality of iterations further includes determining an accuracy for the plurality of classifications output by the language model at the iteration based on a semantic similarity between the plurality of classifications output by the language model at the iteration for the set of first resources and a plurality of corresponding reference classifications for the set of first resources; applying the language model to a set of second resources when the outputs of the language model have been refined, wherein the language model outputs a set of classifications for the set of second resources; labeling training data with respect to the set of second resources based on the set of classifications output by the language model for the set of second resources in order to create a set of labeled training data; and training a classifier machine learning model via supervised machine learning based on the set of labeled training data in order to produce a trained classifier machine learning model.

Certain embodiments disclosed herein also include a non-transitory computer-readable medium having stored thereon causing a processing circuitry to execute a process, the process comprising: refining outputs of a language model by providing a prompt and a set of first resources to the language model over a plurality of iterations, wherein outputs of the language model generated by the language model at each iteration of the plurality of iterations include a plurality of classifications for the set of first resources input to the language model at the iteration, wherein each iteration of the plurality of iterations further includes determining an accuracy for the plurality of classifications output by the language model at the iteration based on a semantic similarity between the plurality of classifications output by the language model at the iteration for the set of first resources and a plurality of corresponding reference classifications for the set of first resources; applying the language model to a set of second resources when the outputs of the language model have been refined, wherein the language model outputs a set of classifications for the set of second resources; labeling training data with respect to the set of second resources based on the set of classifications output by the language model for the set of second resources in order to create a set of labeled training data; and training a classifier machine learning model via supervised machine learning based on the set of labeled training data in order to produce a trained classifier machine learning model.

Certain embodiments disclosed herein also include a system for machine learning classifier training. The system comprises: a processing circuitry; and a memory, the memory containing instructions that, when executed by the processing circuitry, configure the system to: refining outputs of a language model by providing a prompt and a set of first resources to the language model over a plurality of iterations, wherein outputs of the language model generated by the language model at each iteration of the plurality of iterations include a plurality of classifications for the set of first resources input to the language model at the iteration, wherein each iteration of the plurality of iterations further includes determining an accuracy for the plurality of classifications output by the language model at the iteration based on a semantic similarity between the plurality of classifications output by the language model at the iteration for the set of first resources and a plurality of corresponding reference classifications for the set of first resources; applying the language model to a set of second resources when the outputs of the language model have been refined, wherein the language model outputs a set of classifications for the set of second resources; labeling training data with respect to the set of second resources based on the set of classifications output by the language model for the set of second resources in order to create a set of labeled training data; and training a classifier machine learning model via supervised machine learning based on the set of labeled training data in order to produce a trained classifier machine learning mode.

Certain embodiments disclosed herein include a method, non-transitory computer-readable medium, or system as noted above or below, further including or being configured to perform the following step or steps: determining a classification for at least one third resource by applying the trained classifier machine learning model to inputs including the at least one third resource; applying a cybersecurity policy based on the classifications for the at least one third resource in order to detect a violation of the cybersecurity policy; and performing a remediation action based on the detected policy violation.

Certain embodiments disclosed herein include a method, non-transitory computer-readable medium, or system as noted above or below, wherein the remediation action includes quarantining the at least one third resource.

Certain embodiments disclosed herein include a method, non-transitory computer-readable medium, or system as noted above or below, wherein the language model is a first language model of a plurality of language models, wherein the plurality of language models is applied at each iteration, further including or being configured to perform the following step or steps at each iteration: applying a consensus model to each classification output by the plurality of language models applied at the iteration, wherein the accuracies of the classifications output by the plurality of language models applied at the iteration are determined based on an output of the consensus model.

Certain embodiments disclosed herein include a method for classification. The method comprises: applying a classifier machine learning model to inputs indicating a third resource in order to generate a set of classifier machine learning outputs, wherein the classifier machine learning model is trained via supervised machine learning based on a set of labeled training data, wherein the set of labeled training data is created by labeling a set of training data based on a set of classifications for a set of second resources output by a language model when outputs of the language model have been refined, wherein the outputs of the language model are refined by providing a prompt and a set of first resources to the language model over multiple iterations; and determining a classification for the third resource based on the set of resource classifier machine learning outputs.

Certain embodiments disclosed herein also include a non-transitory computer-readable medium having stored thereon causing a processing circuitry to execute a process, the process comprising: applying a classifier machine learning model to inputs indicating a third resource in order to generate a set of classifier machine learning outputs, wherein the classifier machine learning model is trained via supervised machine learning based on a set of labeled training data, wherein the set of labeled training data is created by labeling a set of training data based on a set of classifications for a set of second resources output by a language model when outputs of the language model have been refined, wherein the outputs of the language model are refined by providing a prompt and a set of first resources to the language model over multiple iterations; and determining a classification for the third resource based on the set of classifier machine learning outputs.

Certain embodiments disclosed herein also include a system for classification. The system comprises: a processing circuitry; and a memory, the memory containing instructions that, when executed by the processing circuitry, configure the system to: apply a classifier machine learning model to inputs indicating a third resource in order to generate a set of classifier machine learning outputs, wherein the classifier machine learning model is trained via supervised machine learning based on a set of labeled training data, wherein the set of labeled training data is created by labeling a set of training data based on a set of classifications for a set of second resources output by a language model when outputs of the language model have been refined, wherein the outputs of the language model are refined by providing a prompt and a set of first resources to the language model over multiple iterations; and determine a classification for the third resource based on the set of classifier machine learning outputs.

Certain embodiments disclosed herein include a method, non-transitory computer-readable medium, or system as noted above or below, further including or being configured to perform the following step or steps: applying a cybersecurity policy based on the classification determined for the third resource, wherein the cybersecurity policy defines at least one of permissible and impermissible circumstances with respect to potential classifications of resources.

Certain embodiments disclosed herein include a method, non-transitory computer-readable medium, or system as noted above or below, further including or being configured to perform the following step or steps: detecting a policy violation based on the application of the cybersecurity policy; and performing at least one remediation action based on the detected policy violation.

Certain embodiments disclosed herein include a method, non-transitory computer-readable medium, or system as noted above or below, further including or being configured to perform the following step or steps: performing at least one remediation action with respect to the classification determined for the third resource.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
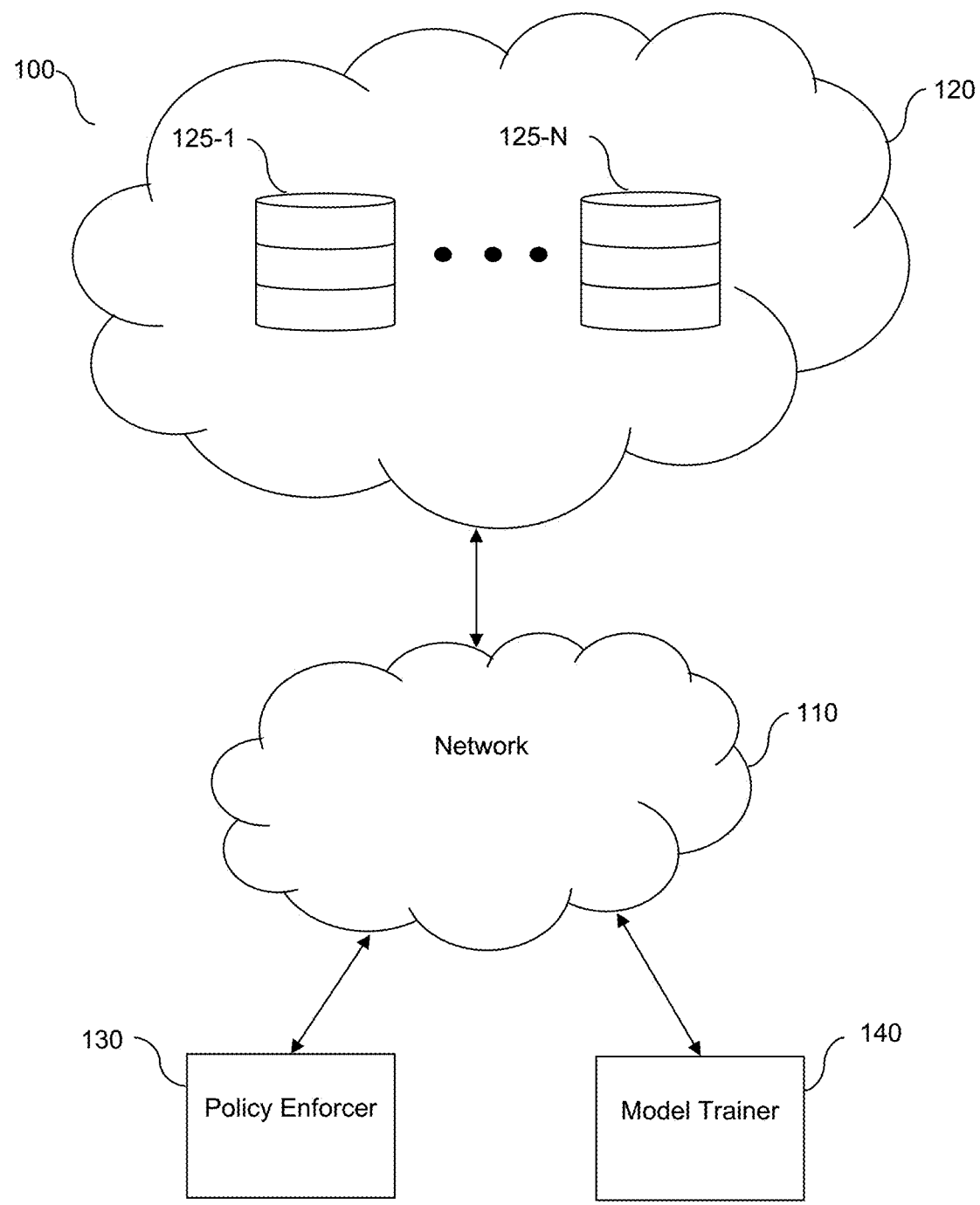
FIG. 1 is a network diagram utilized to describe various disclosed embodiments.

The various disclosed embodiments include techniques for resource-level classification and for securing computing environments using resource-level classifications. More specifically, various disclosed embodiments provide techniques which utilize resources (e.g., files or other data objects) labeled using machine learning (e.g., using one or more large language models) in order to produce a labeled data set for use in training a classifier machine learning model. Accordingly, various disclosed embodiments may be utilized to train a classifier machine learning model to accurately predict classifications for resources at a desired granularity. Further, various disclosed embodiments may allow for training a model to accurately predict such classifications while reducing the total number of samples, in addition to or instead of reducing the number of manually labeled samples, thereby conserving both computing and manual resources related to labeling and training.

In an embodiment, resources among a set of target data are classified by applying a classifier machine learning model such as a resource classification machine learning model (also referred to as a resource-level classifier) which is configured to classify resources as described herein. The classifier is a machine learning model trained to classify resources into custom-defined classifications, and is trained using a labeled training set created at least partially by using one or more language models such as large language models (LLMs) to label sample resources using the custom-defined labels.

Redundant or otherwise similar classifications output by the classifier machine learning model may be consolidated. Sensitivities of the respective resources may be detected based on the classifications. One or more policies are applied based on the classifications, the sensitivities, or both, in order to detect whether storage, transmission, or other activities involving data violate any of the policies. Remediation actions may be performed in order to remediate any detected policy violations.

In some embodiments, in order to improve the training of the resource-level classifier, a refinement process may be utilized in which language model outputs are iteratively refined prior to labeling. This iterative refinement may allow for improving labeling accuracy when using a general-purpose language model (e.g., a language model which has not been fine-tuned based on the desired classifications) or otherwise for further improving labeling accuracy using a language model (whether fine-tuned or not). The refinement process may further include refining the outputs of the language model such that the language model outputs an "unknown" classification or otherwise produces an output indicating that the sample resource does not fit into any of a set of predetermined classifications or otherwise cannot be accurately classified in order to avoid hallucinations by the language model.

The iterative refinement process may include prompting a language model with respect to sample resources and a set of potential resource classifications. In at least some embodiments, each sample resource is associated with a respective reference resource classification. The reference resource classifications may be utilized to determine the accuracy of outputs of the language model with respect to the sample resources, for example in order to determine whether the outputs of the language model would make accurate labels for subsequent resources input to the language model after the refinement. Such accuracy may be at least partially determined based on semantic similarity, N-gram analysis, both, and the like.

The sampling of resources may include filtering resources according to filtering criteria (e.g., filtering criteria based on a number or proportion of valid words in a given resource), clustering based on resource contents, both, and the like. Moreover, the filtering may have a threshold which is set depending on a target level of granularity such as, but not limited to, a lower threshold (e.g., a threshold defining a shorter distance between values representing respective resources) may be set when the target level of granularity is higher as contrasted with lower levels of granularity. In this regard, the sampling may include a filtering or other cleaning step, as well as a clustering or content-based analysis step.

In this regard, it has been identified that language models such as large language models (LLMs) are highly effective at analyzing patterns in order to identify related concepts. Certain general-purpose (e.g., not fine-tuned) LLMs may therefore be able to aid in automatic labeling in order to produce training samples for use in training other machine learning models using a smaller set of initial data. However, general-purpose language models may not provide a target or otherwise desired level of granularity without at least some refinement.

It has been further identified that semantic similarity analysis, N-gram analysis, or both, may be leveraged in order to validate outputs of machine learning models using a process that is at least partially automated, and that such validation may be utilized in order to make decisions about refining language model outputs by inputting further prompts until the language model reaches a certain level of performance. Such validation may therefore allow for automating at least a portion of the process for labeling resource samples while maintaining accuracy comparable to or better than that of manual labeling.

It has also been identified that certain kinds of objects such as files or other resources may be more sensitive in different contexts than other kinds of resources, and that differences in content can be used to determine such sensitivities by leveraging the capabilities of language models and, in particular, large language models (LLMs). As a non-limiting example, a file which is classified as being a "soup recipe" may be low sensitivity when included in a database of a company which sells paper goods (e.g., a soup recipe for such a company may simply represent an employee's personal recipe shared with coworkers), while a file classified as a "soup recipe" may be highly sensitive when included in a database of a company which sells soup (e.g., as a trade secret of that company or otherwise secret information for which exposure of that information would harm the company).

Even if resources were explicitly labeled with appropriate classifications, recognizing appropriate sensitivity levels for data resources which take into account the context of the entity using those data resources is challenging without providing rules which explicitly define sensitivity levels for certain predefined classifications. Accordingly, it has been further identified that language models may be leveraged to contextualize resources having certain classifications, and that these language models may be utilized in tandem with entity information in order to determine appropriate sensitivity levels for resources which are contextualized by the entities which utilize those resources.

It has further been identified that customizing machine learning models (e.g., via fine-tuning) in order to achieve certain purposes may be useful for realizing machine learning models that provide more accurate predictions in certain contexts. However, customizing machine learning models to different contexts is a technical challenge. In particular, a large number of samples may be prepared (e.g., collected and labeled) manually in order to achieve a desired accuracy.

Such manual preparation requires a significant amount of resources, both manual resources (time and labor) and computing resources (e.g., compute resources such as processing power and memory needed to run the training algorithm for the machine learning model on the large number of samples). Although some automated labeling solutions exist, these solutions face challenges in accurately labeling samples and identifying an appropriate diversity of samples in order to efficiently but accurately train machine learning models for classification tasks.

The disclosed embodiments, which provide various techniques for labeling samples, clustering samples for sample size reduction, and other techniques which reduce the total number of samples, the number of samples to be manually labeled, or both, therefore provide various computing performance advantages over at least some existing solutions. Further, the refinement process described herein may be utilized to refine outputs of a language model such as a LLM in order to accurately label resources for use in training a resource-level classifier machine learning model in a supervised learning process.

It is also noted that language models, and in particular LLMs, tend to be more computationally intensive, both to train and to run. By using a process which allows for refining outputs of a general-purpose LLM, certain computational costs of training may be saved by leveraging preexisting LLMs and without requiring further training of the LLM in order to label resource samples.

Accordingly, various disclosed embodiments may be utilized to create a larger labeled training set using a smaller number of initial labeled training samples. That is, outputs of a language model may be refined based on a more limited set of initial labeled training samples in order to generate labels to be used for creating a larger amount of labeled training samples than were included in the predetermined set of initial labeled training samples. The result is that a classifier machine learning model may be trained to classify resources via supervised machine learning without requiring as many manually labeled training samples as would be needed to achieve comparable results using a larger set of manually labeled training samples.

Moreover, the resource-level classifications determined as discussed herein may be utilized in accordance with one or more cybersecurity policies of a given computing environment in order to secure the computing environment. That is, such cybersecurity policies may be defined with respect to classifications of resources, and may define permitted or forbidden circumstances (e.g., permitted or forbidden transmission activities, permitted or forbidden storage locations or other circumstances, etc.) for resources having certain classifications. Thus, the classifications for resources determined as discussed herein may be utilized to detect potential vulnerabilities in data storage or handling, and may further be utilized in order to perform remediation actions to secure the computing environment (and, more specifically, the data stored therein). Likewise, various disclosed embodiments may be utilized to provide visibility into the classifications of resources stored in a given computing environment.

FIG. 1 shows an example network diagram 100 utilized to describe various disclosed embodiments. In the example network diagram 100, a policy enforcer 130 and a model trainer 140 communicate with components in a computing environment 120 via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The cloud environment 120 includes various disks 125-1 through 125-N (hereinafter referred to individually as a disk 125 or collectively as disks 125 for simplicity). The disks 125 may be, but are not limited to, hard drive disks, virtual disks, and the like. Some of the disks 125 may contain data stores (not depicted in FIG. 1) and therefore data in such data stores may be classified in order to provide certain security features to protect those data stores. To this end, the policy enforcer 130 is configured to analyze data in the cloud environment 120 as described herein in order to identify which portions of data among the disks 125 belong to certain classifications, to act to secure the computing environment 120 based on such classifications in accordance with data management policies, both, and the like.

The model trainer 140 may be configured to train machine learning models (not shown in FIG. 1) as described herein. In particular, the model trainer 140 may train resource-level classifier machine learning models, sensitivity detection machine learning models, or both, as described herein.

As discussed herein, the classifier machine learning models are trained to classify resources into certain types, kinds, or other classifications at the resource level. Such resources may be or may include, but are not limited to, files tables, other objects, and the like. The classifications as discussed herein may be more granular than data type (e.g., file, table, etc.) without being classifications for individual portions of data within a given resource. Accordingly, the classifier machine learning models may allow for a more holistic analysis of contents of resources in order to distinguish even resources of the same type (e.g., identifying that one file represents a passport while another file represents a customer intake form rather than simply identifying both resources as files). Such resource-level classifications may be utilized to enforce policies with respect to the resources more accurately, thereby improving security of computing environments with respect to the resources.

The sensitivity detection machine learning models may be trained or fine-tuned to detect sensitivities of resources and, in particular, resources having certain classifications. Such sensitivities may also be utilized in order to more accurately enforce policies with respect to resources as discussed herein. In accordance with various disclosed embodiments, a sensitivity detection machine learning model is realized via a large language model which is fine-tuned in order to detect certain target sensitivities.

It should be noted that FIG. 1 depicts an implementation of various disclosed embodiments, but that at least some disclosed embodiments are not necessarily limited as such. Other deployments, arrangements, combinations, and the like, may be equally utilized without departing from the scope of the disclosure.

In particular, a single model trainer is depicted in FIG. 1 for simplicity purposes, but the disclosed embodiments are not limited as such. Multiple model trainers, or multiple instances of a model trainer, may be equally used without departing from the scope of the disclosure. As a non-limiting example, a first model trainer may be used to train a resource classifier machine learning model as discussed below with respect to FIG. 5, and a second model trainer may be utilized to train a sensitivity detection machine learning model as discussed below with respect to FIG. 6. Moreover, the model trainer 140, any other model trainers or instances thereof, or both, may be integrated into the policy enforcer 130 such that the policy enforcer is configured to train one or more machine learning models (e.g., as discussed below with respect to FIG. 5, FIG. 6, or both) without departing from the scope of the disclosure.

Figure 2:
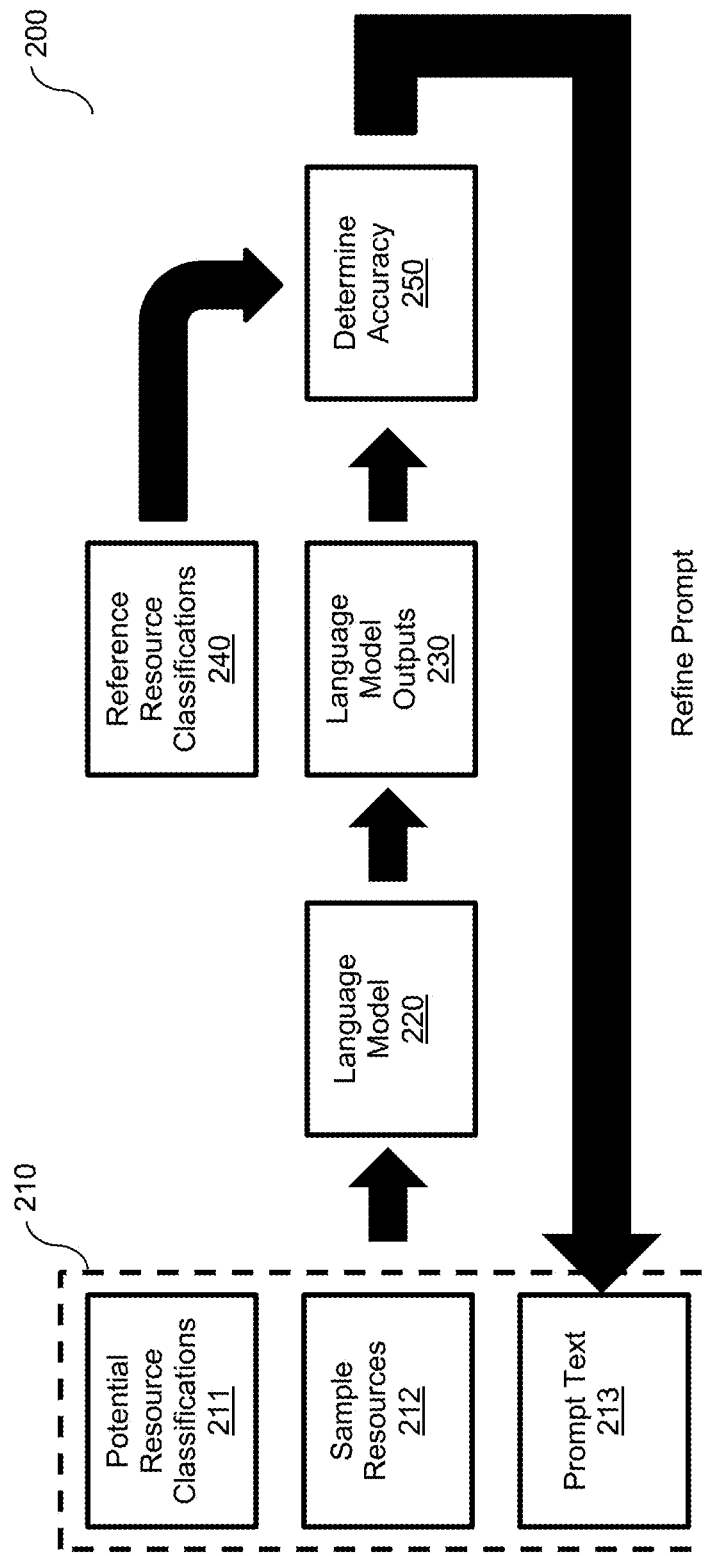
FIG. 2 is a flow diagram illustrating an example process for refining prompts used to label resources to be used for classification training.

FIG. 2 is a flow diagram 200 illustrating an example process for refining prompts used to label resources to be used for classification training. FIG. 2 depicts an iterative refinement process which may be utilized to improve training of a resource-level classifier as discussed herein. Such refinement may allow for automatically generating labels to be used for training a resource-level as described herein, and more specifically to improving the accuracy of such label generation.

In accordance with various disclosed embodiments, such improvements may be realized even when using a general-purpose language model (e.g., a language model which has not been fine-tuned for a particular purpose). This allows for leveraging existing language models which have been previously trained while maintaining labeling accuracy, which in turn allows for avoiding expenditure of computing resources needed to train, retrain, or fine-tune the language model. Particularly when using LLMs, the amount of computing resources needed to train a model having billions or trillions of parameters using huge amounts of training data requires significant computing resources such as processing power and memory. The refinement process may therefore allow for accurately and automatically labeling training samples by producing refined prompts which improve performance of a language model when used as inputs to the language model, without necessarily fine-tuning or otherwise training the language model for a particular purpose.

As depicted in FIG. 2, a set of inputs 210 is provided to a language model 220 in order to produce a set of language model outputs 230. In the non-limiting example implementation shown in FIG. 2, the inputs 210 include a set of potential resource classifications 211, a set of sample resources 212, and prompt text 213. It should be noted that the inputs 210 are not necessarily limiting, and that additional inputs may be utilized without departing from the scope of the disclosure. The inputs 210 may be realized as textual inputs or other inputs representing language to be analyzed via the language model 220.

The potential resource classifications 211 may be or may include a set of known or otherwise predetermined resource classifications to be output by the language model 220. That is, the potential resource classifications 211 may be realized as a list or other set of text indicating different resource classifications that the language model 220 is to output. The potential resource classifications 211 may therefore be desired or otherwise target classifications for which the prompts input to the language model 220 are to be refined in order to output. As discussed further below, classifications indicated among language model outputs 230 may be compared to reference resource classifications as part of an accuracy determination process 250. To this end, in at least some embodiments, the potential resource classifications are or include classifications among the reference resource classifications 240.

In some embodiments, the potential resource classifications 211 include a classification representing or otherwise corresponding to an "unknown" category. Such an "unknown" classification may be utilized in order to mitigate potential hallucinations by the language model 220. As a non-limiting example, the prompts may be refined in order to cause the language model to output such an unknown classification when none of the other potential resource classifications 211 are appropriate for a given input or portion of an input. In an embodiment, such a prompt indicates that the unknown classification is to be returned when a confidence level for each other potential resource classification 211 is below a threshold, and may further indicate the threshold. The threshold may be, for example but not limited to, a predetermined threshold percentage.

In this regard, it is noted that LLMs and other language models are able to create realistic-sounding responses to prompts, but that LLMs can face challenges in hallucinating information. That is, when a LLM does not actually know the "correct" information, it may generate text that appears to be accurate but may include inaccurate or otherwise made up (hallucinated) information. Introducing an unknown classification as one of the potential resource classifications 211 and training the language model 320 to output the unknown classification when no other classification is determined for a given resource may allow for avoiding or otherwise mitigating situations in which the language model 220 hallucinates classifications for resources.

The sample resources 212 may be or may include contents of a respective resource. Such a resource may be, but is not limited to, a logical unit of data which may include text representing information that might need to be secured in order to prevent unauthorized access to confidential or otherwise privileged information. Each resource may be logically distinct from other resources and include a certain group or other set of data. Non-limiting example resources include a file, table, or other object. Such resources may be realized using structured data, unstructured data, or a combination of structured and unstructured data. The sample resources 212 used as inputs among the inputs 210 may be such resources or may include the contents (e.g., text or parameters included in such resources). In at least some embodiments, any or all of the sample resources 212 may be generated as described herein.

In an embodiment, each of the sample resources 212 is associated with a respective reference resource classification among a set of reference resource classifications 240. As discussed further below, such reference resource classifications 240 may be or may include known or otherwise predetermined classifications for respective resources. Accordingly, each of the sample resources 212 may be one of the resources associated with one of the reference resource classifications 240.

In some embodiments, at least some such resources may be realized as fillable forms (e.g., files including such fillable forms). Such fillable forms may have one or more fields which are initially left blank when provided to a user or system so that the user may fill in such fields with parameters or other data representing information for a given entity or situation. The fillable forms used as sample resources among the sample resources 212 may be fillable forms which have been filled (e.g., fully filled which contain data in the fillable fields), fillable forms which have not been filled (e.g., unfilled forms which lack data in the fillable fields), or fillable forms which have been partially filled (e.g., partially filled forms which contain data in some fillable fields and lack data in other fillable fields).

In this regard, the prompts for the language model 220 may be refined with respect to potential resource classifications 211 such as, but not limited to, "filled," "unfilled," or "partially filled." Classifications representing whether a form is fillable, whether a fillable form has been filled (either partially or fully), or both, may allow for further improving sensitivity detection for potentially fillable forms. That is, in some implementations, fillable forms which have been at least partially filled (e.g., partially filled or fully filled) may be considered more sensitive than fillable forms which are unfilled (which may be considered unsensitive or low sensitivity). For entities which collect potentially sensitive information like personally identifiable information via fillable forms, forms which have been at least partially or fully filled are more likely to contain such potentially sensitive information, and may need to be secured more than unfilled forms in at least some implementations.

The prompt text 213 includes text indicating a question or statement created to prompt the language model to make predictions regarding classifications and, in particular, resource-level classifications. The prompt text 213 may request that the language model 220 output classifications among the potential resource classifications 211 with respect to each of the sample resources 212.

The language model 220 may be, but is not limited to, a LLM or other language model configured to provide responses to prompts in natural language and to process textual content using natural language processing. Such a LLM may be, but is not limited to, an artificial neural network. The LLM may utilize a transformer architecture utilizing an attention mechanism to process tokenized text. A LLM may have a large number of parameters (e.g., billions or trillions of parameters), and may be trained on an extremely large training dataset. Such a language model may be effective at recognizing patterns in text and accurately predicting the words following the prompt in order to generate responses to prompts which account for context of language represented by the prompts.

When applied to the inputs 210, the language model 220 generates a set of language model outputs 230. Such language model outputs 230 may be or may include, but are not limited to, text indicating at least a classification for each of the sample resources 212. As noted above, each classification output by the language model 220 may be one of the potential resource classifications 211.

As shown in FIG. 2, classifications included among the set of language model outputs 230 are compared to the set of reference resource classifications 240 in an accuracy determination process 250. In this regard, the reference resource classifications 240 may be utilized to determine the accuracy of the language model outputs 230 with respect to the sample resources 212, for example in order to determine whether the language model 220 would generate accurate labels for subsequent resources input to the language model 220 after the refinement. To this end, the accuracy determination 250 may include performing semantic similarity comparison, N-gram analysis, both, and the like. As a non-limiting example for the semantic similarity, an embedding model may be applied in order to embed the language model outputs 230, and the embedded outputs may be compared to an embedding of the reference resource classifications by determining cosine similarity on vector difference between the results.

In some implementations, user inputs received based on user review of the language model outputs 230 may be received and utilized as part of the accuracy determination 250. In such implementations, the accuracy determination 250 may include comparing a score representing the user inputs to a predetermined threshold in order to determine whether the user inputs indicate that the language model outputs 230 are accurate. Such a score may be explicitly provided in the user inputs, determined based on text included among the user inputs (e.g., by assigning predetermined scores to certain words), and the like.

To this end, in various embodiments, the accuracy determination may include generating an aggregated score that accounts for multiple analysis factors (e.g., factors such as semantic similarity, N-gram analysis results, user inputs, combinations thereof, etc.).

Based on the results of the accuracy determination 250, the prompt text 213, other portions of the inputs 210 to be used for creating the prompt such as the potential resource classifications 211, or both, may be refined for use during a subsequent iteration. The refinement may be performed iteratively, for example, until a predetermined number of iterations has been performed, until a predetermined number of sample resources 212 have been processed over multiple iterations, until performance of the language model 220 as applied to the refined prompts has achieved a predetermined threshold (e.g., when a determined accuracy for a given iteration is above a threshold), and the like. After each iteration of refinement, the language model 320 may be applied again to a refined prompt.

The result of the iterations of refinement is a refined portion of a prompt including refined prompt text 213. The refined portion of the prompt may be combined with new resources in order to create new refined prompts, which in turn can be input to the language model 220 in order to cause the language model 220 to output text indicating predicted classifications for the new resources. The refined prompts are refined such that, when the language model 220 is applied to the refined prompts, the language model 220 provides outputs which are more accurate than the language model 220 would output without such refinement. Such more accurate outputs may be utilized, for example, in order to generate labels for the new resources, which in turn may be utilized to label the new resources with respective classifications such that the new resources and their respective labels can be used in a labeled set to be used for training a classifier machine learning model for resource-level classification as described herein.

Figure 3:
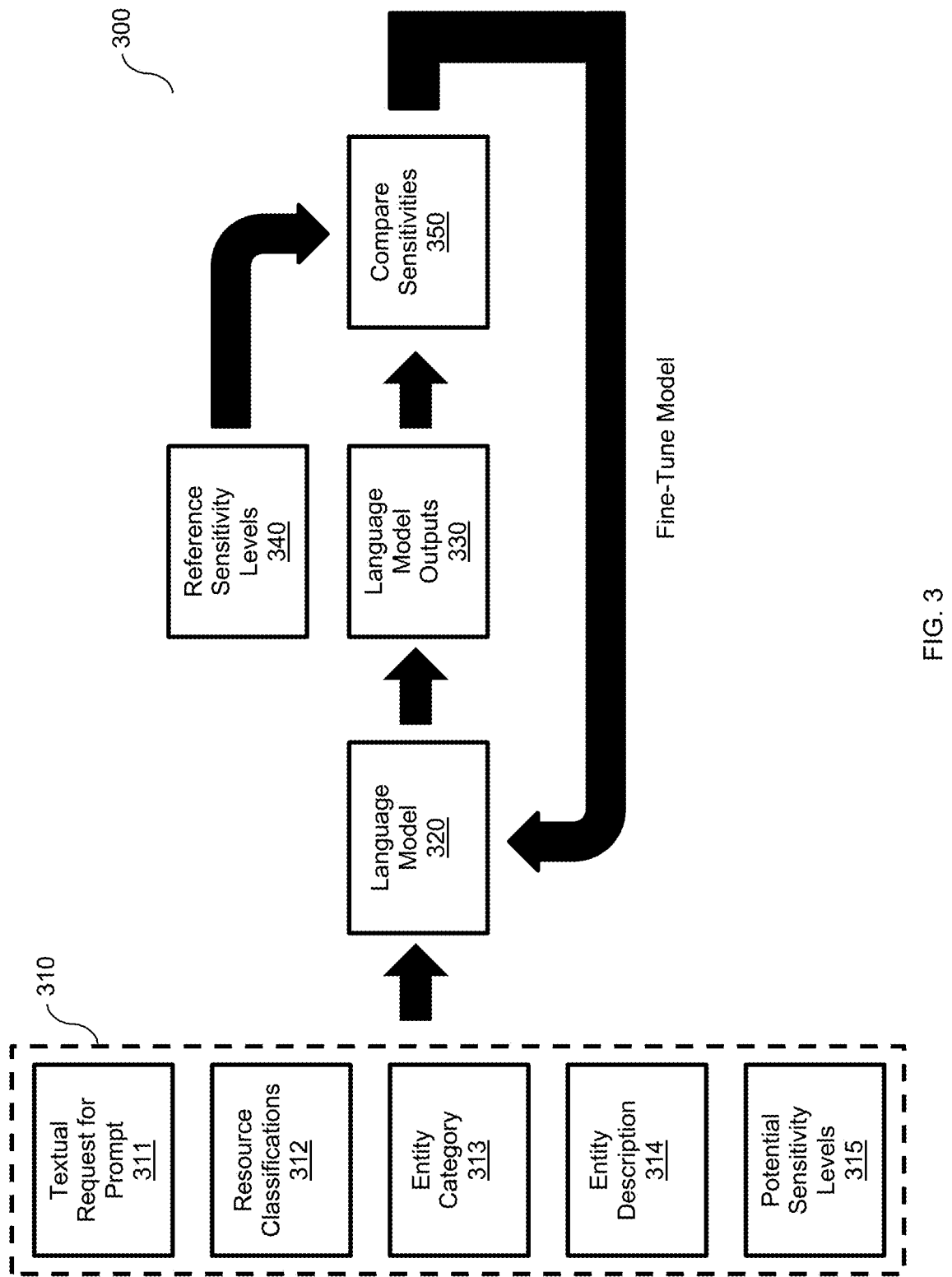
FIG. 3 is a flow diagram illustrating a process for fine-tuning a language model to be used for sensitivity labeling according to an embodiment.

FIG. 3 is a flow diagram 300 illustrating a process for fine-tuning a language model to be used for sensitivity labeling according to an embodiment. The process shown in FIG. 3 is an iterative process which may be utilized to improve labeling of a language model in order to create more accurate labels, which in turn may be utilized for training a sensitivity detection machine learning model as described herein.

As depicted in FIG. 3, a set of inputs 310 is provided to a language model 320 in order to produce a set of language model outputs 330. The set of inputs 310 may be or may include, but are not limited to, a textual question portion of a prompt 311, a set of resource classifications 312, an entity category 313, an entity description 314, and a set of potential sensitivity levels 315. The inputs 310 may be realized as textual inputs or other inputs representing language to be analyzed via the language model 320.

The textual request portion of the prompt 311 includes a question, statement, or other portion of text requesting the language model 320 to perform a prediction with respect to sensitivity detection (e.g., to predict text indicating a sensitivity level for resources having each of the input resource classifications 312). As a non-limiting example, such a textual question portion of the prompt 311 may be "Please determine which sensitivity level for these features." The textual request portion of the prompt 311 may reference or otherwise indicate that the other inputs 310 are to be utilized by the language model for making predictions in response to the prompt.

The resource classifications 312 include classifications of respective resources which may be or may include, but are not limited to, resource-level classifications determined as described herein. To this end, the resource classifications 312 may be classifications determined by applying a classifier machine learning model to data of resources in order to produce outputs indicating resource-level classifications for those resources. In an example implementation, each of the resource classifications 312 is associated with a respective resource. Moreover, as discussed further below, each such resource may be associated both with one of the resource classifications 312 and with a respective reference sensitivity level among a set of reference sensitivity levels 340.

The entity category 313 may indicate an industry, group, or other category to which an entity belongs, and may specifically indicate information about an entity which utilizes the resources having the resource classifications 312. Such an entity category 313 provides contextual information about the entity which utilizes the resource which may be relevant to the sensitivity levels of resources having certain classifications. As a non-limiting example, a file having a classification of "menu" file may be high sensitivity for a company in the restaurant industry or otherwise in the food industry as compared to a company in the paper goods industry.

The entity description 314 provides a description of the products, services, or other offerings of an entity. The entity description 314 may further include a textual description of other information which may be relevant to sensitivity detection such as, but not limited to, company values. This additional contextual information may help further contextualize classifications, for example by allowing for more granular sensitivity detection than entity category alone. As a non-limiting example, for a company in the food industry having "food industry" as an entity category 313, a "soup recipe" file may be high sensitivity if the entity description 314 of the company indicates that the company makes or sells soups and may be low sensitivity if the entity description 314 only indicates that the company makes and sells hamburgers and fries.

The potential sensitivity levels 315 may be or may include predefined sensitivity levels. In particular, in at least some embodiments, the potential sensitivity levels 315 may correspond to sensitivity levels indicated or otherwise defined in policies to be applied to secure computing environments. That is, the potential sensitivity levels 315 may correspond to respective sensitivity levels used for making decisions about when and how to secure certain resources in order to secure computing environments including those resources. As a non-limiting example, when a policy defines different storage or handling requirements for resources having low, medium, and high sensitivity levels, respectively, the potential sensitivity levels 315 may include "low," "medium," and "high."

As a non-limiting example for a combination of inputs which may be included among the inputs 310, a textual request portion of the prompt 311 may include the text "Please determine which sensitivity level for these features," a resource classification 312 for one of the resources may be "menu," an entity category 313 may be "food industry," an entity description 314 may be "fast food chain which sells hamburgers, fries, and milkshakes," and potential sensitivity levels 315 may include "none," "low," "medium," and "high." For the resource having this resource classification "menu" given the additional context provided by the entity category 313 and the entity description 314, a sensitivity level which may be expected from a properly fine-tuned sensitivity detection machine learning model may be "high" (i.e., indicating that a file representing a menu is high sensitivity for a company in the fast food industry).

The language model 320 may be, but is not limited to, a LLM or other language model configured to provide responses to prompts in natural language and to process textual content using natural language processing. Such a LLM may be, but is not limited to, an artificial neural network. The LLM may utilize a transformer architecture utilizing an attention mechanism to process tokenized text. A LLM may have a large number of parameters (e.g., billions or trillions of parameters), and may be trained on an extremely large training dataset. Such a language model may be effective at recognizing patterns in text and accurately predicting the words following the prompt in order to generate responses to prompts which account for context of language represented by the prompts.

The language model outputs 330 may be or may include, but are not limited to, textual outputs indicating at least a sensitivity level for each of the resource classifications 312. Such sensitivity levels may therefore represent a predicted sensitivity for the resource associated with each of the resource classifications 312 made by the language model 320.

As noted above, each resource associated with one of the resource classifications 312 may also be associated with a respective reference sensitivity level among the reference sensitivity levels 340. Each of the reference sensitivity levels 340 may represent a known or otherwise predetermined sensitivity level for the associated resource such that the reference sensitivity levels 340 may be utilized to verify the accuracy of the sensitivity levels indicated among the language model outputs 330.

To this end, as shown in FIG. 3, sensitivity levels indicated in the language model outputs 330 are compared to the respective reference sensitivity levels in a comparison process 350. That is, for each resource associated with one of the resource classifications 312, the sensitivity level output indicated by the language model outputs 330 with respect to that resource is compared to the reference sensitivity level for that resource among the reference sensitivity levels 340.

Based on the comparison, the language model 320 is fined-tuned. The fine-tuning may include, but is not limited to, adjusting weights of the model based on results of the comparison. The fine-tuning may be performed iteratively, for example, until a predetermined number of iterations has been performed, until a predetermined number of sample resource classifications have been processed over multiple iterations, until performance of the fine-tuned language model 320 has achieved a predetermined threshold (e.g., when at least a threshold number or proportion of the comparison results indicate matches between sensitivity levels indicated in the language model outputs 330 and the respective reference sensitivity levels 340), and the like. After each iteration of fine-tuning, the language model 320 may be applied again, either to new inputs or to the original set of inputs 310.

In some embodiments, when one or more sensitivity levels indicated in the language model outputs 330 do not match the respective reference sensitivity level among the reference sensitivity levels 340 for a given resource or otherwise when a proportion of the compared sensitivity levels which match is below a threshold, the fine-tuning may include providing a new prompt to the language model 320 indicating that the predicted sensitivity levels were not correct or otherwise performing another iteration of fine-tuning. Such a prompt may include a predetermined textual portion noting the error, and may further include text indicating information such as, but not limited to, which resource classification or classifications among the resource classifications 312 were incorrectly evaluated by the language model 320, what the "correct" sensitivity level is for each such incorrectly evaluated resource classification (e.g., what was the reference sensitivity level for the resource associated with that resource classification), both, and the like.

The result of fine-tuning the language model over one or more such iterations is a fine-tuned language model which has been refined to more accurately predict sensitivity levels for resources having certain resource classifications. The fine-tuned language model may be applied to new resource classifications (e.g., for newly discovered resources or for resources which were otherwise previously not analyzed for sensitivity level) in order to detect sensitivity levels for the new resources associated with the new resource classifications. The sensitivity levels for the newly detected resources may be utilized to label input data including resource classifications for those newly detected resources, and such labeled input data may be utilized to train a sensitivity detection machine learning model using a supervised learning process as described herein. Such a sensitivity detection machine learning model may have a smaller number of parameters than the language model 320 or otherwise may be a lighter weight model requiring fewer computing resources such as processing power or memory as well as requiring fewer inputs in order to process, thereby conserving computing resources as compared to using the language model to detect sensitivities.

It should be noted that, at least in some implementations, the refinement process may be utilized in order to fine-tune the language model for sensitivity detection (thereby producing a fine-tuned sensitivity detection machine learning model) without necessarily requiring an entire file or otherwise the entirety of the data of a resource. That is, given a classification of the resource, it may be possible to accurately detect the sensitivity level of the resource with respect to a given entity using a fine-tuned sensitivity detection machine learning model as described herein without requiring the underlying data in the resource. Accordingly, the fine-tuning process may be performed using a lower amount of data, thereby allowing for training faster and more efficiently than techniques which require the entirety of the resources to be provided as inputs for the fine-tuning process.

Figure 4:
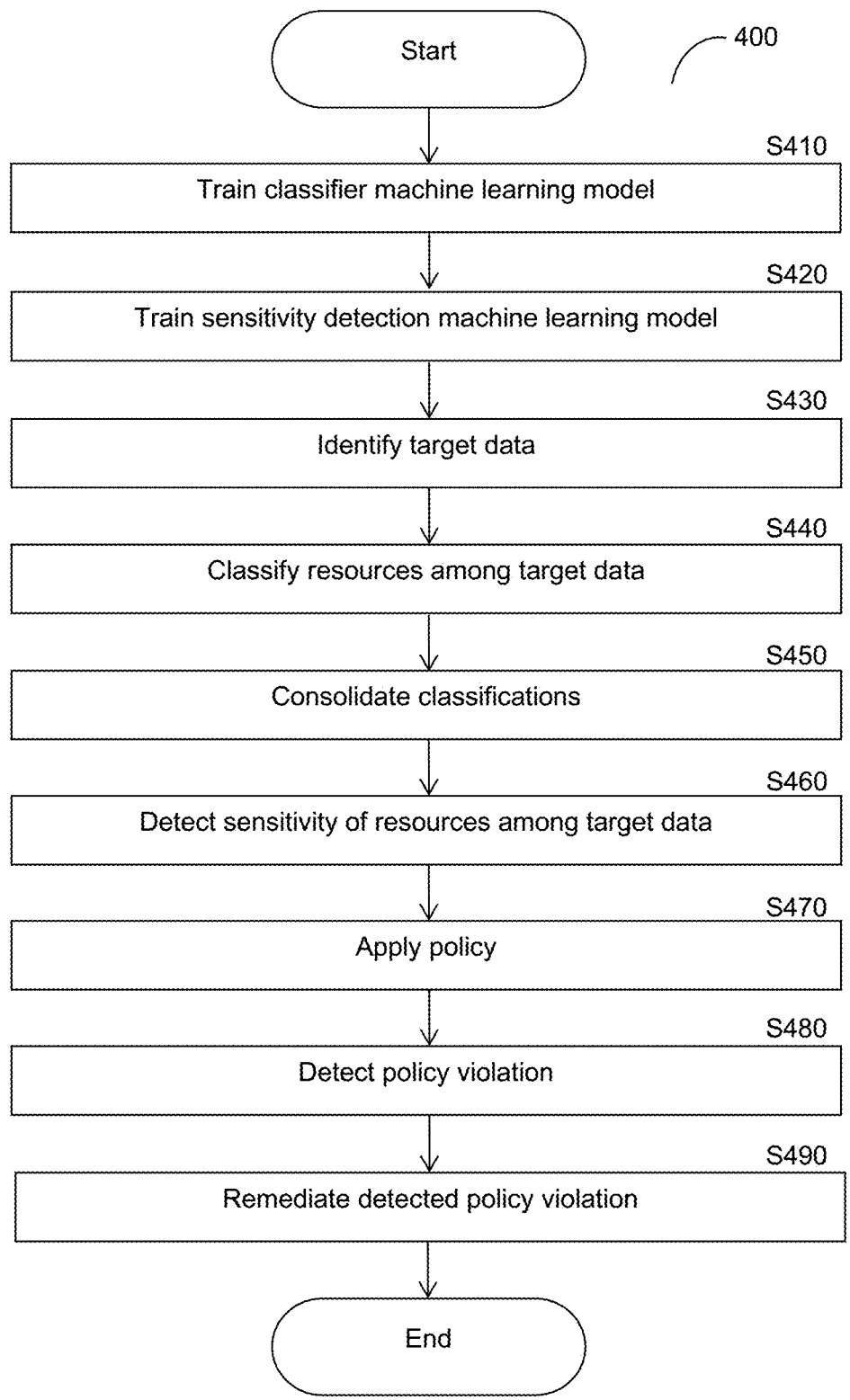
FIG. 4 is a flowchart illustrating a method for securing a computing environment with respect to classifications and sensitivities according to an embodiment.

FIG. 4 is a flowchart 400 illustrating a method for securing a computing environment with respect to classifications and sensitivities according to an embodiment. In an embodiment, the method is performed by the policy enforcer 130, FIG. 1. In some embodiments, at least a portion of the process may be performed by another system such as the model trainer 140, FIG. 1.

At S410, a classifier machine learning model (also referred to as a classifier) is trained. More specifically, the classifier machine learning model is trained to output predictions of classifications for resources based on input data of the resources such as, but not limited to, textual data of contents of the resources. In this regard, the classifier machine learning model becomes trained as a resource classifier machine learning model or resource-level classification machine learning model configured to output data indicating potential classifications for resources (e.g., a predicted classification for a resource or a set of scores indicating respective likelihoods of different potential classifications for the resource).

In an embodiment, the classifier machine learning model is trained using a training data set including training resources or contents thereof. In a further embodiment, the classifier machine learning model is trained via a supervised learning process using a labeled training data set including the training resources or contents thereof and corresponding labels. In yet a further embodiment, the labels at least indicate a classification for each training resource or training set of contents of a resource. Such labels may be generated by a language model such as a large language model (LLM), and more specifically may be generated after iteratively refining prompts to optimize the language model performance in label generation as described herein.

An example process which may be utilized to train the classifier machine learning model is described further below with respect to FIG. 5. Moreover, as noted below with respect to FIG. 5, such training may further include refining prompts to the language model in order to improve language model outputs for the refined prompts. The refinement process is discussed further above with respect to FIG. 2.

At S420, a sensitivity detection machine learning model is trained. In an embodiment, the sensitivity detection machine learning model is trained to determine sensitivities (e.g., sensitivities expressed in forms such as sensitivity levels, scores, or other indicators of degree of sensitivity relative to other sensitivities) for resources. More specifically, the sensitivity detection machine learning model is trained to detect sensitivities for resources based on resource classifications.

In some embodiments, the sensitivity detection machine learning model may be realized as a classifier trained to output data indicating classifications corresponding to potential sensitivities of resources. In other embodiments, the sensitivity detection machine learning model may be realized as a regression model trained to output data indicating sensitivity scores for resources.

In at least some implementations, the sensitivity detection machine learning model may be trained to detect sensitivities in a manner that is unique to a given entity. That is, the sensitivity detection machine learning model may be trained to detect sensitivities for that entity based on characteristics of that entity such as, but not limited to, an industry or other category for the entity, a description of the entity and its products or services, and the like. To this end, in embodiments for such implementations, the sensitivity detection machine learning model may be trained using a labeled training set including labels generated based on outputs of a fine-tuned language model, where the language model was fine-tuned using entity-specific data (e.g., as discussed above with respect to FIG. 3).

In an embodiment, the sensitivity detection machine learning model is trained using a training data set including training resource classifications. In a further embodiment, the sensitivity detection machine learning model is trained via a supervised learning process using a labeled training data set including the training resources or contents thereof and corresponding labels. In yet a further embodiment, the labels at least indicate a classification for each training resource or training set of contents of a resource. Such labels may be generated by a language model such as a large language model (LLM), and more specifically may be generated after iteratively refining prompts to optimize the language model performance in label generation as described herein.

An example process which may be utilized to train the sensitivity detection machine learning model is described further below with respect to FIG. 6. Moreover, as noted below with respect to FIG. 6, such training may further include fine-tuning the language model in order to improve language model outputs for the refined prompts. The refinement process is also discussed further above with respect to FIG. 2.

It should be noted that each of the classifier machine learning model training and the sensitivity detection machine learning model training may involve applying a language model. Such a language model is a machine learning model which may be, but is not limited to, a large language model (LLM). In at least some embodiments, different language models may be utilized for the classifier machine learning model training and for the sensitivity detection machine learning model training. As a non-limiting example, a fine-tuned model which has been fine-tuned with respect to sensitivity may be used for creating the training data set for training the sensitivity detection machine learning model, while a general purpose language model which has not been fine-tuned may be used for creating the training data set for training the classifier machine learning model in tandem with refined prompts for the general-purpose language model. In other embodiments, the same language model may be used for creating both the training data for the classifier machine learning model and the training data for the sensitivity detection machine learning model.

At S430, target data is identified. The target data may be or may include, but is not limited to, data of a computing environment. Such data of the computing environment may include resources, where the computing environment is to be secured with respect to the resources therein. The data may be stored in one or more data stores, databases, and the like. In some implementations, the target data may be indicated in a request. To this end, in some embodiments, S430 may further include receiving a request indicating the target data and identifying the target data based on the request (e.g., based on one or more locations of data indicated in the request).

In an embodiment, S430 further includes identifying resources within the target data. That is, S430 may include identifying the resources to be classified among the target data. As noted above, each resource may be a logical unit of data such as, but not limited to, a file, table, or other object. Each resource includes data which may be analyzed as discussed herein (e.g., using machine learning) in order to classify the resource containing the data. To this end, each resource may include text or other parameters representing information which may be sensitive or otherwise require certain security measures.

At S440, resources among the target data are classified. In an embodiment, classifying the resources includes applying the trained classifier machine learning model to the resources or otherwise to features extracted from the resources. The classifier machine learning model outputs data indicating classifications for the resources. Such output data may be or may include, but is not limited to, a top or otherwise best match classification for each resource, a set of scores indicating a likelihood that each of multiple classifications is the correct classification for the resource, and the like. When the output data includes a set of scores, the classifications for the resources may be determined based on the scores (e.g., by selecting a classification with the highest score for each resource).

At S450, the classifications may be consolidated. In an embodiment, consolidating the classifications includes clustering resources based on their classifications and analyzing distances between clusters in order to identify matching pairs of clusters. Resources among a cluster in each matching pair of clusters may be reclassified to the same classification as resources in the other cluster of the matching pair, thereby consolidating the different classifications represented by the different clusters. In this regard, clusters having different classifications but for which the resources are similar may be indicative that the different classifications represent similar concepts or otherwise effectively represent the same underlying classification. Accordingly, consolidating classifications between such similar resources allows for more accurately classifying resources by causing resources which are similar to have the same classification rather than different classifications.

An example process for consolidating classifications is discussed further below with respect to FIG. 7.

At S460, sensitivities of the resources among the target data are detected. In an embodiment, detecting the sensitivities of the resources includes applying the trained sensitivity detection machine learning model to the classifications of the resources. The sensitivity detection machine learning model outputs, for each of the resources, a predicted sensitivity (e.g., a score representing a sensitivity or a classification representing a sensitivity level).

At S470, one or more policies are applied based on the classifications, the sensitivities, or both. The policies may be or may include, but are not limited to, policies for securing computing environments with respect to resources. The policies may be defined with respect to classifications, sensitivities, combinations thereof, and the like. The policies may define required conditions for resources, forbidden conditions for resources, both, and the like. That is, for a given resource having a certain classification, a certain sensitivity, or both, a policy may defined required or forbidden conditions for that resource. The conditions which may be required or forbidden may be defined with respect to storage, usage, transmission, access, or other conditions which may affect security of the resources within the computing environment.

At S480, a policy violation is detected based on the applied policy. The policy violation may be or may include, but is not limited to, failing to meet a required condition, being in a forbidden condition, and the like.

At S490, the detected policy violation is remediated by performing one or more remediation actions. The remediation actions may include, but are not limited to, quarantining resources, blocking transmission of resources, blocking or denying access to resources, generating a notification indicating a policy violation with respect to resources, combinations thereof, and the like.

Figure 5:
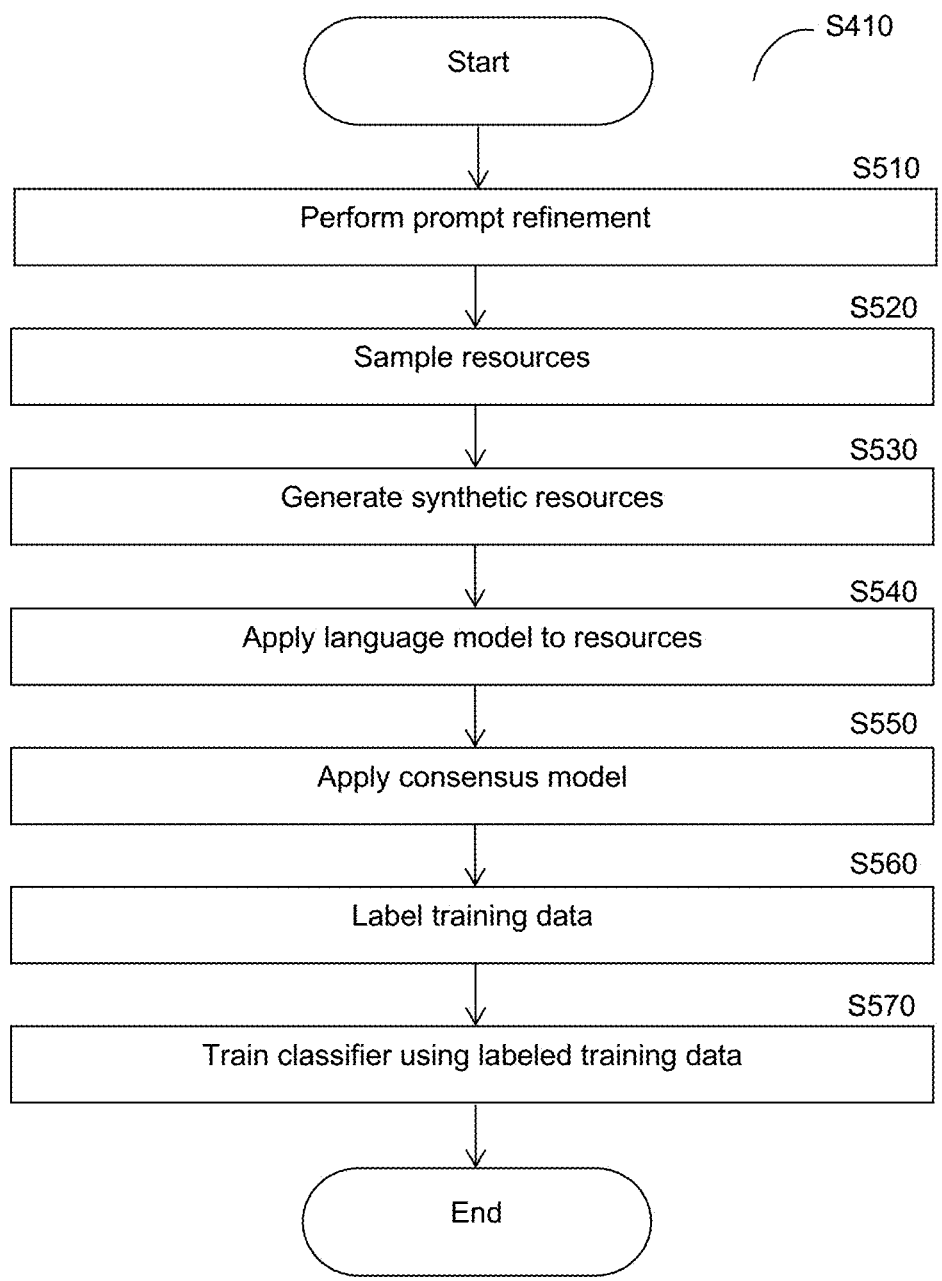
FIG. 5 is a flowchart illustrating a method for training a resource classifier machine learning model according to an embodiment.

FIG. 5 is a flowchart S410 illustrating a method for training a resource classifier machine learning model according to an embodiment. In an embodiment, the method is performed by the policy enforcer 130, FIG. 1. In another embodiment, the process is performed by the model trainer 140, FIG. 1.

At S510, prompt refinement is performed in order to refine portions of the prompt to be combined with input resources and potential resource classifications. The result is a portion of prompt text that, when combined with other inputs and provided to a language model, improve the accuracy of the classifications output by the language model. To this end, the prompt refinement may include, but is not limited to, providing inputs to a language model in order to produce a set of language model outputs including predicted classifications for sample resources represented in the inputs, and determining an accuracy of the language model outputs using a set of known reference resource classifications for the sample resources. An example prompt refinement process is described further below with respect to FIG. 2.

At S520, resources are sampled from among a set of potential training resources. In an embodiment, a predetermined number of resources are samples from among the set of potential training resources, where the predetermined number of resources to be sampled may depend on the implementation.

In an embodiment, sampling the resources includes filtering resources according to filtering criteria (e.g., filtering criteria based on a number or proportion of valid words in a given resource), clustering based on resource contents, both, and the like. Moreover, the filtering may have a threshold which is set depending on a target level of granularity such as, but not limited to, a lower threshold (e.g., a threshold defining a shorter distance between values representing respective resources) may be set when the target level of granularity is higher as contrasted with lower levels of granularity. In this regard, the sampling may include a filtering or other cleaning step, as well as a clustering or content-based analysis step. The resources may then be sampled from among the resources which remain after the filtering.

At optional S530, synthetic resources may be generated and added to a set of resources including the sampled resources. In an embodiment, generating the synthetic resources includes prompting a language model (e.g., a LLM) to create resources for having certain classifications of interest (e.g., classifications among a set of potential classifications for which a classifier machine learning model is to be trained to identify). To this end, the prompt input to the language model may include, but is not limited to, text requesting the language model to output resources such as files having certain classifications, and may further include text indicating the classifications.

At S540, one or more language models are applied to a set of resources including the sampled resources and optionally including the synthetic resources. Each language model is applied to the set of resources in order to produce outputs including a predicted classification for each resource among the set of resources. In some implementations, each language model may be applied multiple times, thereby resulting in multiple sets of outputs for each language model. These multiple sets of outputs may be analyzed using a consensus model as described with respect to S550.

At optional S550, a consensus model is applied based on the outputs of the language models. More specifically, the consensus model may be applied when multiple language models are applied in order to determine a consensus classification for each resource based on the classifications output by the multiple language models. In an embodiment, applying the consensus model includes determining a majority vote. As a non-limiting example, when 2 language models are applied 3 times each for a total of 6 sets of outputs (3 sets of outputs produced by each of the 2 language models), a classification for a given resource which appears in at least 4 of the 6 sets of outputs is determined as the consensus classification for that resource. Using a consensus model in this manner may improve accuracy of subsequent labeling.

At S560, training data including a set of training resources is labeled based on the outputs of the language models and, optionally, the outputs of the consensus model, in order to produce a set of labeled training data. More specifically, each training resource is labeled with a respective classification for the resource. The classification used to label each training resource may be a classification indicated for the resource among the outputs of the language model, or may be the consensus classification for the resource determined using the consensus model as described with respect to S550.

At S570, a classifier machine learning model is trained using the labeled training data set. More specifically, the classifier is trained using supervised machine learning based on the labeled training set. The resulting trained classifier is trained to output classifications for resources.

Figure 6:
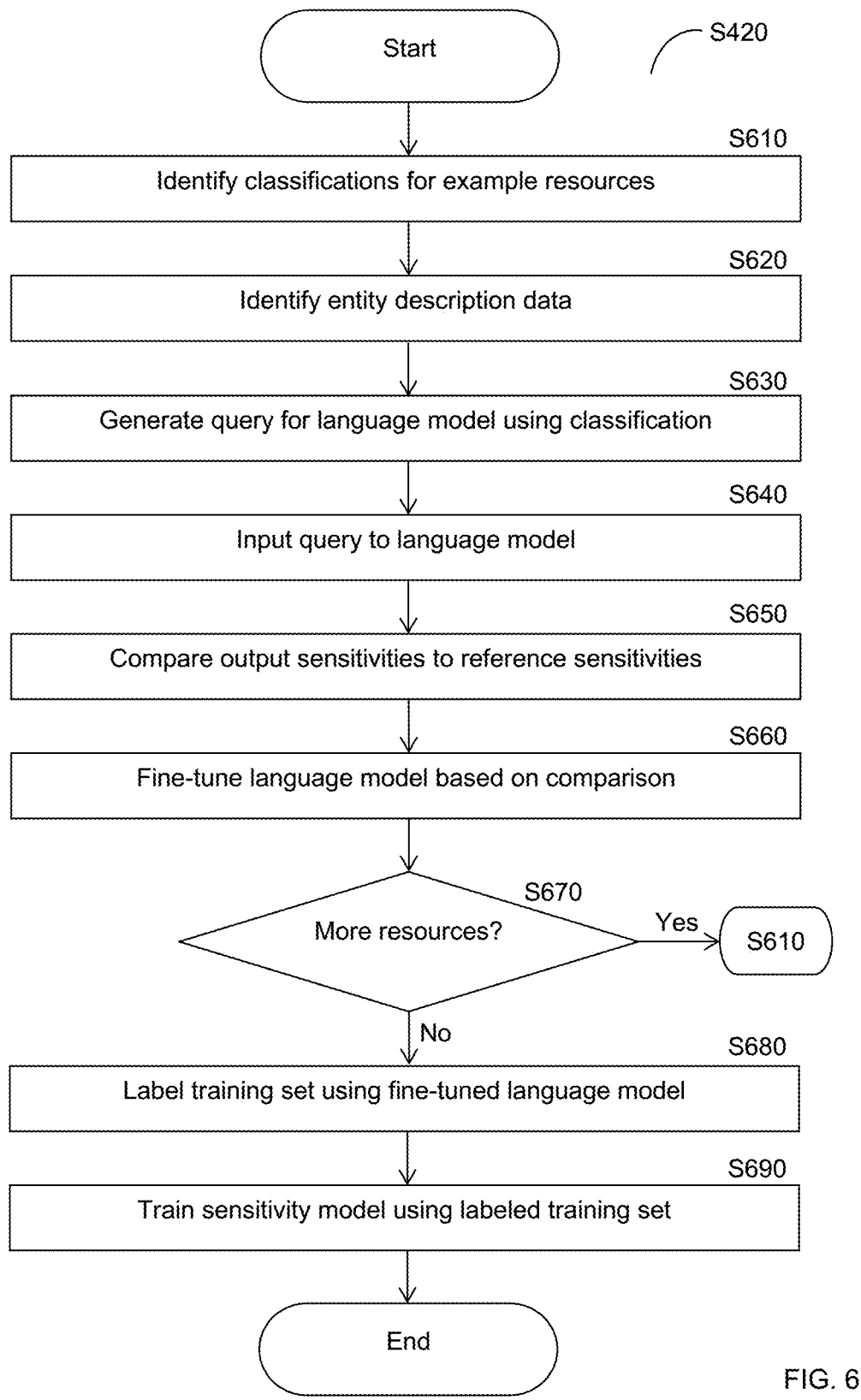
FIG. 6 is a flowchart illustrating a method for training a sensitivity detection machine learning model according to an embodiment.

FIG. 6 is a flowchart S420 illustrating a method for training a sensitivity detection machine learning model according to an embodiment. In an embodiment, the method is performed by the policy enforcer 130, FIG. 1. In another embodiment, the process is performed by the model trainer 140, FIG. 1.

Further, in some embodiments, the training of the resource classifier machine learning model and the sensitivity detection machine learning model may be performed by different systems (e.g., different model trainers or instances of a model trainer). In such embodiments, the process of FIG. 6 may be performed by a different model trainer or instance of a model trainer than the process of FIG. 5.

At S610, a classification is identified for each of one or more example resources. Each example resource is a resource having a known or otherwise predetermined sensitivity level. The identified classification for each example resource may be a known classification for the example resource (e.g., a predetermined classification for the example resource or a classification determined by applying a classifier machine learning model trained as described in accordance with any of the disclosed embodiments). In accordance with various disclosed embodiments, the classification is a resource-level classification which describes or otherwise represents a type of resource.

At S620, entity description data is identified for an entity. More specifically, the entity is an entity for which the sensitivity detection machine learning model is to be trained. As noted above, resources used by different entities belonging to different categories or providing different offerings may be assigned different sensitivities. That is, a resource having a given classification for one entity may be more sensitive than a resource having the same classification for a different entity. The entity description data describes information of the entity which may affect sensitivity of different kinds of resources and may include, but is not limited to, an entity category, an entity description, both, and the like.

In an embodiment, identifying the entity description data further includes obtaining the entity description data. Obtaining the entity description data may include, but is not limited to, receiving the entity description data (e.g., as user inputs), retrieving the entity description data (e.g., from a database), and the like. In another embodiment, the entity description data may be identified as entity description data obtained at a previous iteration.

At S630, a query is generated. The query is a textual prompt including or otherwise created based on the identified classifications and the entity description data. The query further includes a textual request portion (e.g., the textual request 311).

At S640, the query is input to a language model such as, but not limited to, a large language model (LLM). The query acts as a prompt to a language model and prompts the language model to output a predicted sensitivity level for each of the example resources whose classifications are represented among the identified classifications. In response to the query, the language model outputs one or more outputs including or otherwise indicating predicted sensitivities for the example resources having the resource classifications indicated in the query.

At S650, the predicted sensitivities represented in the outputs of the language model are compared to predetermined reference similarities for the respective example resources. The comparison may be performed in order to determine, for example, whether each output predicted sensitivity matches the corresponding reference similarity, a degree to which the predicted sensitivities match their corresponding reference similarities, and the like.

At S660, based on the results of the comparison, the language model is fine-tuned. In an embodiment, fine-tuning the language model includes adjusting the weights of the language model based on the comparison results.

At S670, it is determined if more resources are to be used for fine-tuning and, if so, execution continues with S610; otherwise, execution continues with S680. In some embodiments, the language model may be iteratively fine-tuned, for example until a predetermined number of iterations has been performed or until the language model achieves a target performance.

At S680, a training data set is labeled using the fine-tuned language model in order to create a labeled training data set. The training data set may be or may include a set of training resource classifications corresponding to respective resources. Each resource classification may be labeled with a respective label generated based on outputs of the fine-tuned language model as applied to the resource classification. To this end, in an embodiment, labeling the training data set further includes applying the fine-tuned language model to the training resource classifications and determining the sensitivity levels for resources having the training resource classifications based on the outputs of the fine-tuned language model.

At S690, a sensitivity detection machine learning model is trained using the labeled training data set. In an embodiment, training the sensitivity detection machine learning model includes applying a supervised machine learning algorithm using the labeled training data set. The resulting trained sensitivity detection machine learning model is configured to output predicted sensitivities (e.g., sensitivity levels or scores) for resources having certain resource classifications based on inputs including the classifications of those resources.

Figure 7:
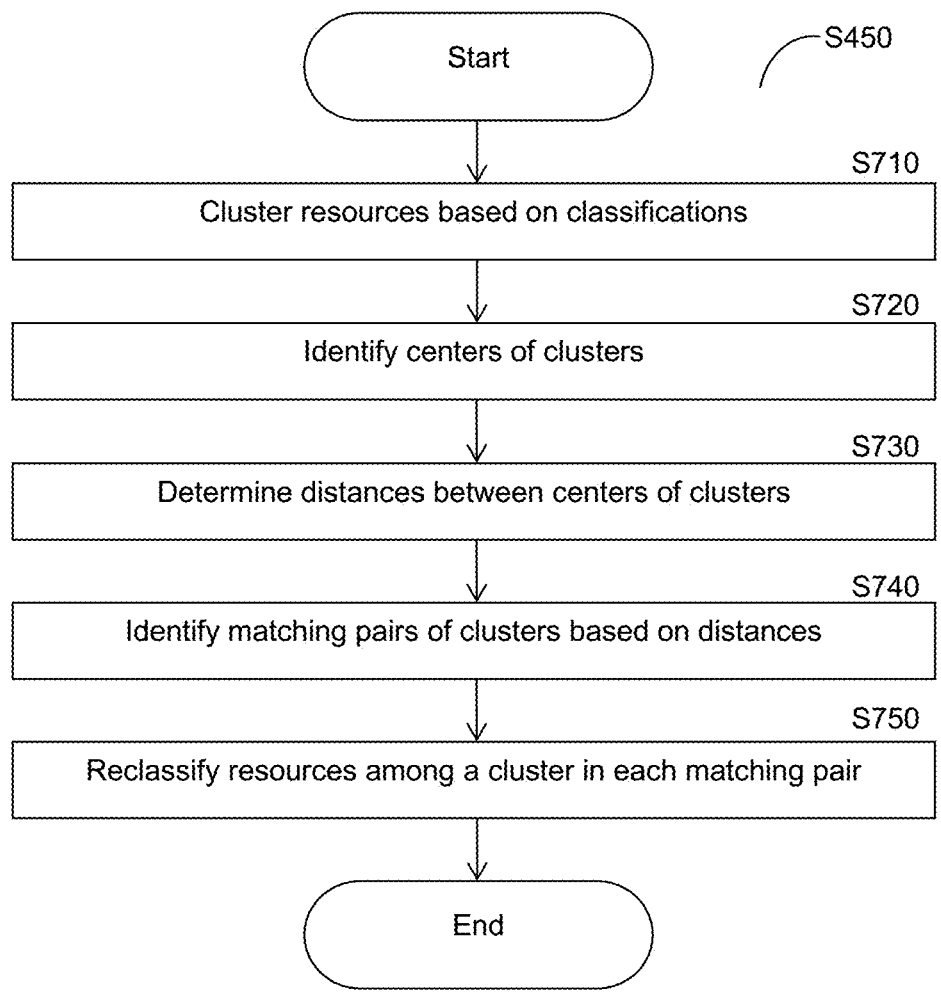
FIG. 7 is a flowchart illustrating a method for condensing classifications according to an embodiment.

FIG. 7 is a flowchart S450 illustrating a method for condensing classifications according to an embodiment. In an embodiment, the method is performed by the policy enforcer 130, FIG. 1.

At S710, resources are clustered based on their respective classifications. The resources may be clustered based on the contents of the resources. In an embodiment, clustering the resources includes selecting sample points and determining numbers of points within radii of the sample points in order to determine whether the radius around each sample point is a cluster. Once all sample points have been checked, a set of clusters may be determined. The clustering may include, but is not limited to, applying one or more clustering algorithms such as a hierarchical clustering algorithm (e.g., HDBSCAN). More specifically, the clustering may be a semantic clustering performed based on semantic similarities between contents of the resources.

An example process for clustering resources based on classifications which may be utilized at S710 is described further below with respect to FIG. 8.

At S720, a center is identified for each cluster. The center of each cluster may be, but is not limited to, a point for which a pairwise distance to each other point within the cluster is minimized.

At S730, distances are determined between the centers of the clusters. In an embodiment, determining the distances includes calculating a distance between points representing the centers of the clusters.

At S740, matching pairs of clusters are identified based on the determined distances between cluster centers. In an embodiment, each matching pair of clusters includes two clusters for which the distance between the centers of the two clusters is below a predetermined threshold. That is, each matching pair of clusters includes a first cluster and a second cluster, where the distance between the center of the first cluster and the center of the second cluster is below a threshold.

At S750, resources in a first cluster of each matching pair of clusters are reclassified based on the classification of resources in the respective second cluster of the matching pair of clusters. That is, the classifications of the resources in each matching pair of clusters are harmonized so that all resources in both clusters of each matching pair of cluster have the same classification. As noted above, this reclassification of resources results in consolidating classifications, thereby resulting in a lower number of total classifications. As further noted above, classifications which are highly similar and therefore effectively redundant may sometimes be determined, particularly when classification labeling is performed using language models. Accordingly, consolidating classifications may allow for more accurately classifying resources by classifying highly similar resources (e.g., as determined based on cluster distances) into the same classifications.

Figure 8:
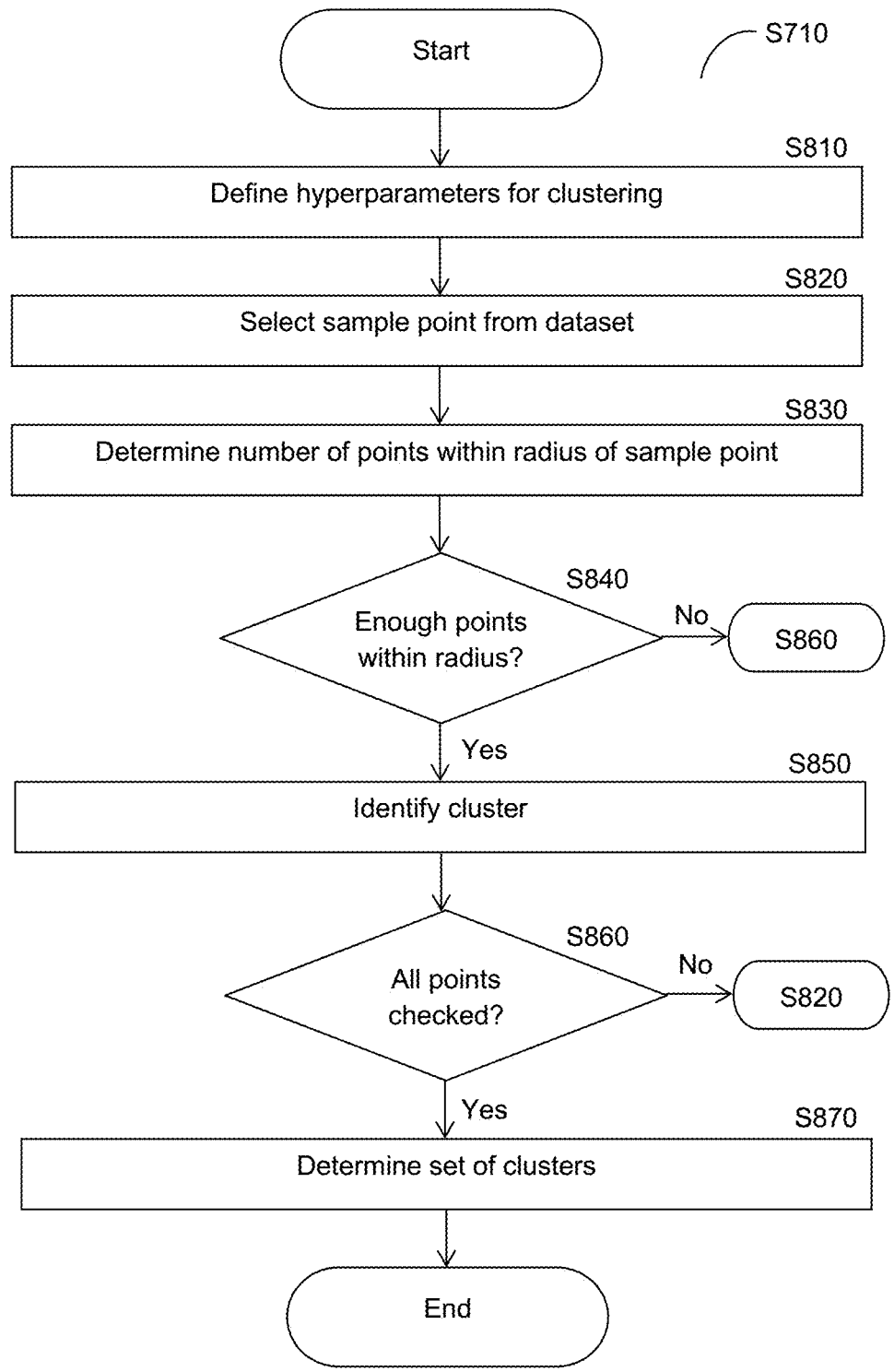
FIG. 8 is a flowchart illustrating a method for clustering resources using classifications according to an embodiment.

FIG. 8 is a flowchart S710 illustrating a method for clustering resources using classifications according to an embodiment. In an embodiment, the method is performed by the policy enforcer 130, FIG. 1.

At S810, hyperparameters to be used for clustering are determined. The hyperparameters may be set such that clusters determined via the clustering are close (e.g., within a predetermined threshold of each other). In some implementations, the hyperparameters may be set such that only resources whose centers are very close (e.g., resources which share a high proportion of matching content) are clustered together.

At S820, a sample point is selected from among a dataset. In an embodiment, sample points are selected iteratively until at least a certain number of points in each cluster have been selected as sample points and analyzed as described with respect to steps S830 through 850.

At S830, a number of points within a predetermined radius of the sample point is determined. The value of the predetermined radius may be determined based on the implementation.

At S840, it is determined whether the number of points within the radius of the sample point is above a predetermined threshold and, if so, execution continues with S850; otherwise, execution continues with S860.

At S850, when the number of points within the radius of the sample point is above the threshold, a cluster is identified. Specifically, the identified cluster includes the sample point and all points within the radius of the sample point.

At S860, it is determined whether all potential sample points have been checked and, if so, execution continues with S870; otherwise, execution continues with S820 where a new sample point is selected.

At S870, a set of clusters is determined. The set of clusters includes each of the identified clusters.

Figure 9:
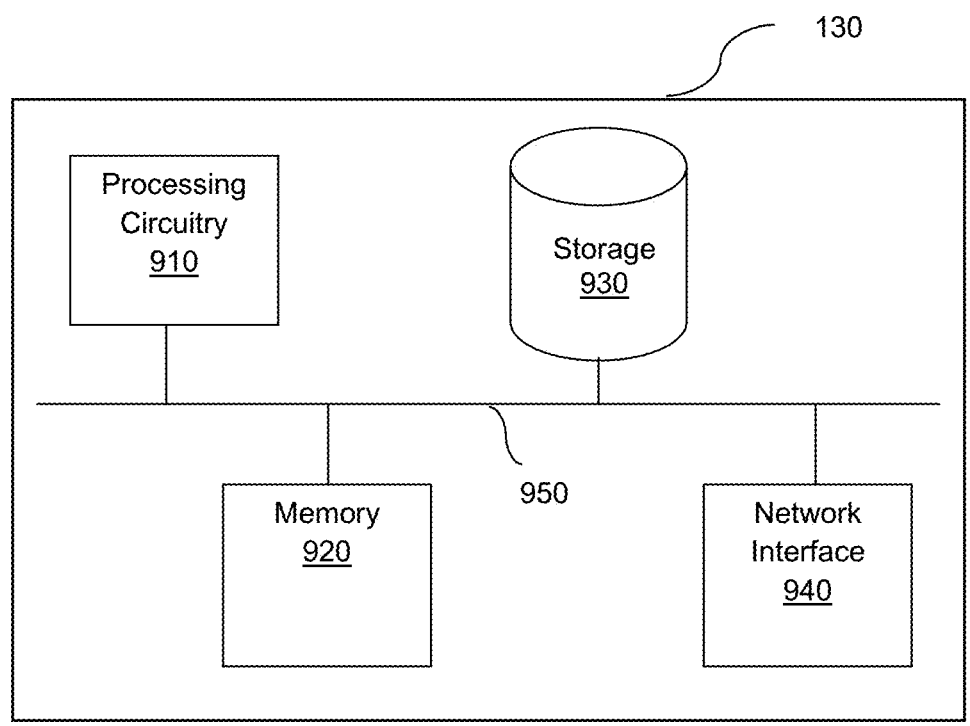
FIG. 9 is a schematic diagram of a policy enforcer according to an embodiment.

FIG. 9 is an example schematic diagram of a policy enforcer 130 according to an embodiment. The policy enforcer 130 includes a processing circuitry 910 coupled to a memory 920, a storage 930, and a network interface 940. In an embodiment, the components of the policy enforcer 130 may be communicatively connected via a bus 950.

The processing circuitry 910 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 920 may be volatile (e.g., random access memory, etc.), non-volatile (e.g., read only memory, flash memory, etc.), or a combination thereof.

In one configuration, software for implementing one or more embodiments disclosed herein may be stored in the storage 930. In another configuration, the memory 920 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 910, cause the processing circuitry 910 to perform the various processes described herein.

The storage 930 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 940 allows the policy enforcer 130 to communicate with other systems, devices, components, applications, or other hardware or software components, for example as described herein.

It should be understood that the embodiments described herein are not limited to the specific architecture illustrated in FIG. 9, and other architectures may be equally used without departing from the scope of the disclosed embodiments.

Figure 10:
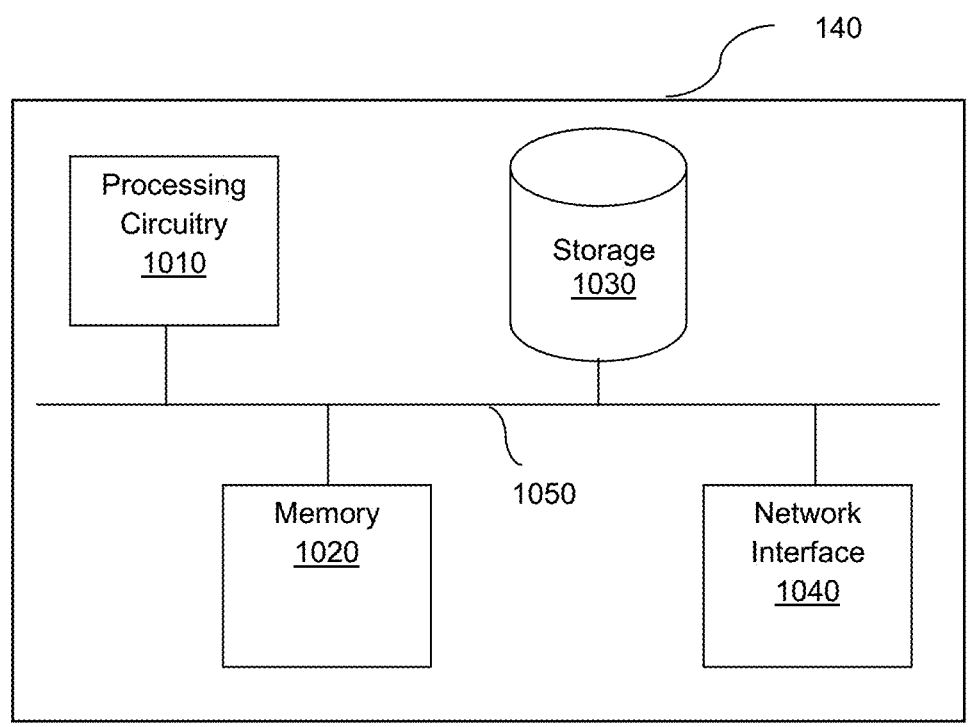
FIG. 10 is a schematic diagram of a model trainer according to an embodiment.

FIG. 10 is an example schematic diagram of a model trainer 140 according to an embodiment. The model trainer 140 includes a processing circuitry 1010 coupled to a memory 1020, a storage 1030, and a network interface 1040. In an embodiment, the components of the model trainer 140 may be communicatively connected via a bus 1050.

The processing circuitry 1010 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 1020 may be volatile (e.g., random access memory, etc.), non-volatile (e.g., read only memory, flash memory, etc.), or a combination thereof.

In one configuration, software for implementing one or more embodiments disclosed herein may be stored in the storage 1030. In another configuration, the memory 1020 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 1010, cause the processing circuitry 1010 to perform the various processes described herein.

The storage 1030 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 1040 allows the model trainer 140 to communicate with other systems, devices, components, applications, or other hardware or software components, for example as described herein.

It should be understood that the embodiments described herein are not limited to the specific architecture illustrated in FIG. 10, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for machine learning classifier training, comprising:
    refining outputs of a language model by providing a prompt and a set of first resources to the language model over a plurality of iterations, wherein outputs of the language model generated by the language model at each iteration of the plurality of iterations include a plurality of classifications for the set of first resources input to the language model at the iteration, wherein each iteration of the plurality of iterations further includes determining an accuracy for the plurality of classifications output by the language model at the iteration based on a semantic similarity between the plurality of classifications output by the language model at the iteration for the set of first resources and a plurality of corresponding reference classifications for the set of first resources;
    applying the language model to a set of second resources when the outputs of the language model have been refined, wherein the language model outputs a set of classifications for the set of second resources;
    labeling training data with respect to the set of second resources based on the set of classifications output by the language model for the set of second resources in order to create a set of labeled training data; and
    training a classifier machine learning model via supervised machine learning based on the set of labeled training data in order to produce a trained classifier machine learning model.

2. The method of claim 1, further comprising:
    determining a classification for at least one third resource by applying the trained classifier machine learning model to inputs including the at least one third resource;
    applying a cybersecurity policy based on the classifications for the at least one third resource in order to detect a violation of the cybersecurity policy; and
    performing a remediation action based on the detected policy violation.

3. The method of claim 2, wherein the remediation action includes quarantining the at least one third resource.

4. The method of claim 1, wherein the language model is a first language model of a plurality of language models, wherein the plurality of language models is applied at each iteration, wherein each iteration further includes:
    applying a consensus model to each classification output by the plurality of language models applied at the iteration, wherein the accuracies of the classifications output by the plurality of language models applied at the iteration are determined based on an output of the consensus model.

5. A system for machine learning classifier training, comprising:
    a processing circuitry; and
    a memory, the memory containing instructions that, when executed by the processing circuitry, configure the system to:
    refine outputs of a language model by providing a prompt and a set of first resources to the language model over a plurality of iterations, wherein outputs of the language model generated by the language model at each iteration of the plurality of iterations include a plurality of classifications for the set of first resources input to the language model at the iteration, wherein each iteration of the plurality of iterations further includes determining an accuracy for the plurality of classifications output by the language model at the iteration based on a semantic similarity between the plurality of classifications output by the language model at the iteration for the set of first resources and a plurality of corresponding reference classifications for the set of first resources;
    apply the language model to a set of second resources when the outputs of the language model have been refined, wherein the language model outputs a set of classifications for the set of second resources;
    label training data with respect to the set of second resources based on the set of classifications output by the language model for the set of second resources in order to create a set of labeled training data; and
    train a classifier machine learning model via supervised machine learning based on the set of labeled training data in order to produce a trained classifier machine learning model.

6. The system of claim 5, wherein the system is further configured to:
    determine a classification for at least one third resource by applying the trained classifier machine learning model to inputs including the at least one third resource;
    applying a cybersecurity policy based on the classifications for the at least one third resource in order to detect a violation of the cybersecurity policy; and
    performing a remediation action based on the detected policy violation.

7. The system of claim 6, wherein the remediation action includes quarantining the at least one third resource.

8. The system of claim 5, wherein the language model is a first language model of a plurality of language models, wherein the plurality of language models is applied at each iteration, wherein the system is further configured to, at each iteration:

apply a consensus model to each classification output by the plurality of language models applied at the iteration, wherein the accuracies of the classifications output by the plurality of language models applied at the iteration are determined based on an output of the consensus model.

* * * * *